United States Patent [19]

Havens et al.

[11] Patent Number: 5,356,468
[45] Date of Patent: Oct. 18, 1994

[54] ANTISTAT COATING COMPOSITIONS AND ANTISTAT LAYERS FORMED THEREFROM

[75] Inventors: Charles T. Havens, Churchville; Raymond T. Jones, Webster; John M. Fukushima; Jack J. Holt, both of Rochester, all of N.Y.

[73] Assignee: Eastman Kodak Company, Rochester, N.Y.

[21] Appl. No.: 68,006

[22] Filed: May 27, 1993

[51] Int. Cl.$^5$ ............................................. C09D 101/18
[52] U.S. Cl. ..................................... 106/195; 252/519
[58] Field of Search ........................ 106/195; 252/519

[56] References Cited

U.S. PATENT DOCUMENTS 3,359,126 12/1967 Barbre ................................. 106/187
4,203,769 5/1980 Guestaux ............................ 423/592

*Primary Examiner*—David Brunsman
*Attorney, Agent, or Firm*—Robert A. Gerlach

[57] ABSTRACT

Coating composition, antistat layer and photographic element having a $V_2O_5$ antistat layer, the layer containing an amount of cellulose nitrate to prevent precipitation of the $V_2O_5$ in the presence of film base.

13 Claims, No Drawings

ANTISTAT COATING COMPOSITIONS AND ANTISTAT LAYERS FORMED THEREFROM

FIELD OF THE INVENTION

This invention relates to antistat coating compositions and to antistat layers produced by applying such compositions to supports. More particularly it relates to photographic elements containing at least one such antistat layer.

BACKGROUND OF THE INVENTION

U.S. Pat. No. 4,203,769 issued May 20, 1980 to Guestaux relates to antistatic layers for photographic applications based on vanadium pentoxide. In addition to the conductive metal oxide, various polymeric binders are added to increase the mechanical durability of the antistatic layer. In particular, various cellulose derivatives are used for this purpose including cellulose acetate, cellulose acetate butyrate, methyl cellulose, cellulose acetate phthalate and cellulose etherphthalate. These cellulose derivative binders together with vanadium pentoxide form particularly stable dispersions in solvent mixtures. These solutions can be stored for long periods without the formation of precipitates of the oxide. They can also be filtered to remove large particulates without plugging the filter media with metal oxide. Both are essential for the practical use of vanadium pentoxide in manufacturing.

However, when such coating solutions are applied to cellulose acetate film supports by immersion roll coating, significant coating defects result. These coating solutions, which are stable in their own right, are unstable in the presence of the cellulose triacetate film support. As a result, precipitates of the metal oxide form in the coating bead and are then deposited as visible specks in the coating layer. Such specks are objectionable in a photographic film product.

SUMMARY OF THE INVENTION

This invention provides vanadium pentoxide coating compositions, antistat layers applied from such coating compositions and photographic elements having an antistat layer wherein an amount of cellulose nitrate polymer is added to the coating composition to stabilize the vanadium pentoxide when dispersed in a solvent. Chemicals such as cellulose triacetate that normally cause the precipitation of vanadium pentoxide dispersions do not have this effect in the presence of cellulose nitrate. As a result, these dispersions can be roll coated as antistatic layers on cellulose triacetate film support without depositing specks of precipitated material. Furthermore, the addition of relatively small amounts of cellulose nitrate greatly increases the stability and coatability of dispersions which include other polymers or resins to provide additional features to the antistat layer.

DETAILED DESCRIPTION OF THE INVENTION

The coating compositions in accordance with this invention include a dispersion of vanadium pentoxide ($V_2O_5$) and cellulose nitrate in a coating vehicle. The vanadium pentoxide is present in the composition in an amount of less than 0.2 weight percent based on the total weight of the composition and at least 0.04 parts of cellulose nitrate per part of $V_2O_5$. The balance is coating vehicle.

$V_2O_5$ is preferably present in an amount of from about 0.02 to about 0.2 weight percent of the coating composition, more preferably in an amount less than about 0.15 and most preferably in an amount of less than 0.1 weight percent.

While the cellulose nitrate can be employed solely as the binder polymer, it is preferably employed in an amount up to 10 parts of $V_2O_5$ and most preferably in an amount of up to 2 parts per part of $V_2O_5$ together with other suitable binder polymers.

The coating vehicle is a solvent for the cellulose nitrate and binder polymer and a dispersant for the $V_2O_5$. Suitable materials include ketones such as acetone, methylethyl ketone, diethyl ketone, dibutyl ketone and the like; alcohols such as, methanol, ethanol, n-propanol, isopropanol, n-butanol, isobutanol, tert-butanol; water and the like. A particularly suitable vehicle includes a mixture of a ketone, an alcohol and water. Most preferably a mixture of acetone, an alcohol such as ethanol, methanol, isopropanol, etc. and water is used. Recovered alcohol that comprises about 76% ethanol, 12% isopropanol, 5% methanol and 7% water can also be employed.

In addition, other binder polymers are employed in an amount up to about 5% by weight based on the total weight of the coating composition, preferably up to about 2% by weight and more preferably from about 0.05 to about 1% by weight. Suitable binder polymers include cellulose acetate, cellulose triacetate, cellulose acetate butyrate, polyurea formaldehyde, copolymers of methacrylate and acrylate esters.

The coating compositions can also contain flow and leveling additives such as silicone polyethers which are well known in the art.

The coating compositions and antistat layers in accordance with this invention when applied to photographic elements provide improved results due to the elimination of imperfections, speck marks etc. as a result of the interaction of the $V_2O_5$ in the presence of the cellulose triacetate film support. Preferably the antistat layer should have an overcoat layer, such as described in U.S. Pat. No. 5,006,451 which is incorporated herein by reference.

The $V_2O_5$ antistat layer should be applied in a coverage of at least 0.3 mg/ft$^2$, preferably from about 0.8 to about 2.0 mg/ft$^2$.

Photographic elements having antistat layers of the invention generally comprise at least one light-sensitive layer, such as a silver halide emulsion layer. This layer may be sensitized to a particular spectrum of radiation with, for example, a sensitizing dye, as is known in the art. Additional light-sensitive layers may be sensitized to other portions of the spectrum. The light sensitive layers may contain or have associated therewith dye-forming compounds or couplers. For example, a red-sensitive emulsion would generally have a cyan coupler associated therewith, a green-sensitive emulsion would be associated with a yellow coupler. Other layers and addenda, such as overcoat layers with or without matte particles, subbing layers, surfactants, filter dyes, protective layers, barrier layers, development inhibiting releasing compounds, and the like can be present in photographic elements of the invention, as is well-known in the art. Detailed description of photographic elements and their various layers and addenda can be found in the above-identified *Research Disclosure* 17643 and in James, *The Theory of the Photogarapohic Process*, 4th, 1977.

Photographic elements in accordance with this invention are disclosed in Research Disclosure 22534, January 1983, which is incorporated herein by reference. Further, the light sensitive elements disclosed in U.S. Pat. No. 4,980,267, fully incorporated herein by reference, are particularly applicable to protection by the overcoat layers in accordance with this invention.

The invention will be further illustrated by the following examples:

General Procedure

Example 1

Stabilization of Vanadium Pentoxide Solvent Dispersions by Cellulose Nitrate

The following three coating dispersions are prepared, the values being in percent by weight:

|  | 1A (Control) | 1B (Invention) | 1C (Control) |
|---|---|---|---|
| Acetone | 50.00 | 25.00 | 25.00 |
| Recovered alcohol (See Note 1) | 0.00 | 66.13 | 66.23 |
| Methanol | 30.10 | 0.00 | 0.00 |
| Water | 19.75 | 8.72 | 8.72 |
| Vanadium Pentoxide | 0.05 | 0.05 | 0.05 |
| Cellulose Acetate 320S (Note 2) | 0.10 | 0.00 | 0.00 |
| Cellulose Nitrate SNPE 40-60 (Note 3) | 0.00 | 0.10 | 0.00 |

Notes:
1. Approximately 76% Ethanol, 12% Isopropanol, 7% Water, 5% methanol
2. Product of Tennessee Eastman
3. Product of Societe Nationale Powders and Explosives To each of these dispersions, three strips of unsubbed cellulose triacetate film support two inches by four inches by 0.007 inches are added and allowed to stand for about ten minutes. At that time the containers are gently agitated and the dispersions inspected with the assistance of a light source. The dispersion containing cellulose nitrate, Example B, shows no change in the quality of the vanadium pentoxide dispersion. The other dispersions, the one without a polymeric binder, Example 1C, and the one with a binder, Example 1A, have significant amounts of precipitate. These dispersions are stable indefinitely in the absence of the cellulose triacetate film support. This demonstrates the surprising effectiveness of cellulose nitrate to stabilize the vanadium pentoxide solvent dispersion in the presence of the photographic support.

The two coating dispersions containing polymeric binders, Examples 1A and 1B, are further evaluated in coating experiments using a roll coating machine. Both are filtered through a 20 micron filter and delivered to the coating hopper with no degradation in the state of the dispersion. Shortly after starting to coat a cellulose triacetate web, the dispersion Example 1A develops particulates in the coating bead which break free from the nip and deposit on the coated support. After drying, brownish specks are visible to the unaided eye on the support. In contrast, the cellulose nitrate coating dispersion, Example 1B, is successfully applied with no particulates. The photographic support has a surface resistivity less than $10^8$ ohms per square (compared to $10^{12}$ ohms per square for the uncoated support) which is sufficient to protect photographic film from static discharge. The ability to coat the cellulose nitrate based composition without defects and to achieve the desired level of conductivity demonstrates the practicality of the invention.

Example 2 Effect of Cellulose Nitrate Concentration

The following stock dispersions are prepared, values being by weight:

|  | Example 2A | Example 2B |
|---|---|---|
| Acetone | 20.00 | 40.00 |
| Recovered Alcohol (See Note 1) | 64.93 | 44.93 |
| Water | 15.00 | 15.00 |
| Vanadium Pentoxide | 0.05 | 0.05 |
| Cellulose Nitrate SNPE 40-60 (Note 3) | *** See Text *** | |

The concentration of the cellulose nitrate is varied for both Examples 2A and 2B solvent compositions to provide 0.000%, 0.002%, 0,005%, 0.05%, 0.07% based on total formulation weight. When cellulose triacetate film support is immersed in the dispersions, the 0.000% cellulose nitrate dispersions form precipitates within minutes; the 0.002% concentrations remain free of precipitates for a matter of minutes, the higher concentrations remain free of precipitates for more than 24 hours. This demonstrates that levels of cellulose nitrate as low as 4%, based on the weight of the vanadium pentoxide are effective but levels above 10% are preferred.

Example 3 Concentration of Vanadium Pentoxide and Cellulose Nitrate

A series of dispersions are prepared varying the concentration of cellulose nitrate and vanadium pentoxide. These dispersions are prepared in a solvent mixture that is 30% acetone, 17.5% water with the balance recovered ethanol. The dispersions are coated on cellulose triacetate support and the conductivity of the support is determined. The numeric values reported are the surface resistivities in terms of log ohms. Table 1 indicates the appearance of the coated support: "clear" means that the support is defect free, "strings" indicates there is a visible defect in the form of brownish lines in the coating layer, "hazy" indicates that the coating is not perfectly clear after drying.

TABLE 1

| Weight percent cellulose nitrate SNPE 40-60 | Weight percent vanadium pentoxide | | | | | |
|---|---|---|---|---|---|---|
|  | 0.05 | .075 | 0.10 | 0.125 | 0.15 | 0.20 |
| 0.10 | 7.6 Clear | 7.6 Clear | 7.9 Clear | 6.6 Clear | 6.4 Clear | 6.3 Strings |
| 0.20 | 7.4 Clear | 7.2 Clear | 7.4 Clear | 6.0 Strings | 6.3 Strings | 6.0 Strings |
| 0.50 | 7.4 Clear | 7.1 Clear | 7.2 Clear | | | |
| 1.00 | 7.2 Clear | 7.2 Clear | 6.2 Clear | | | |
| 1.50 | 8.4 Hazy | | | | | |
| 2.00 | 8.4 Hazy | | | | | |
| 4.00 | 8.4 Insoluble Hazy | | | | | |

It can be seen that as much as 0.20 weight per cent vanadium pentoxide can be used effectively but given that there is no practical benefit from higher levels of metal oxide as the support conductivity is within acceptable limits for all of the levels investigated, the preferred range is up to 0.15% and the most preferred range is up to 0.10%. In terms of dry weight coverages, this amounts to 6, 4.5 and 3.0 mg/ft$^2$ respectively.

The effective level of cellulose nitrate can be as high as 40:1 based on the solids of vanadium pentoxide without any significant increase in surface resistivity. Preferred levels of cellulose nitrate are up to and including 10:1, most preferred are up to and including 2:1.

Addition of Other Polymers to Cellulose Nitrate Stabilized Vanadium Pentoxide Dispersions On occasion, it may be desirable to combine vanadium pentoxide with other polymeric binders. For example, polymers such as cellulose acetate contain less acid than does cellulose nitrate and excessive acid can cause degradation of cellulose triacetate film support. Other polymers can provide physical performance features beyond that attainable with cellulose nitrate. For example, urea formaldehyde resins are well known crosslinkers to improve the physical performance of various polymers such as acrylic resins. Surprisingly, it has been found that a small amount of cellulose nitrate allows these polymers to be added to the solvent dispersions of vanadium pentoxide without forming the precipitates observed in the absence of the cellulose nitrate. Example 4 Addition of Cellulose Acetate A series of dispersions are prepared containing a mixture of cellulose nitrate and cellulose acetate, parts being by weight:

|  | A | B | C | D |
|---|---|---|---|---|
| Acetone | 25.00 | 35.00 | 45.00 | 55.00 |
| Cellulose Nitrate SNPE 40–60 (Note 3) | 0.025 | 0.025 | 0.025 | 0.025 |
| CA398-3 (Note 2) | 0.075 | 0.075 | 0.075 | 0.075 |
| Recovered Ethanol (Note 1) | 66.20 | 56.20 | 46.20 | 36.20 |
| Water | 8.80 | 8.80 | 8.80 | 8.80 |
| Vanadium Pentoxide | 0.05 | 0.05 | 0.05 | 0.05 |

These dispersions are stable by themselves and in the presence of cellulose triacetate support. Similar dispersions prepared with 0.1% CA398-3 with no cellulose nitrate are unstable as the vanadium oxide precipitates. Example 5 Addition of Urea Formaldehyde Cross-linking Agent

|  | Example 5A Control | Example 5B |
|---|---|---|
| Vanadium Pentoxide | 00.057% | 00.050% |
| Beetle 80 (See Note 5) | 00.090 | 00.050 |
| Cycat 4040 (See Note 6) | 00.002 | 00.0025 |
| Cellulose Nitrate SNPE 40–60 | 00.000 | 00.100 |
| Acetone | 30.000 | 32.800 |
| Recovered Ethanol | 59.851 | 52.575 |
| Water | 10.000 | 14.400 |

Notes:
Note 5: A methylated urea formaldehyde resin, a product of American Cyanamid Inc.
Note 6: Acid catalyst, a product of American Cyanamid, Inc.

The sample without the cellulose nitrate precipitated in a few minutes. The sample with cellulose nitrate is stable for 24 hours at least and provides a support with an internal resistivity of $10^8$ ohms per square.

The addition of cellulose nitrate to solvent dispersions of vanadium pentoxide substantially increases the stability of these dispersions. This allows such dispersions to be used in roll coating for the manufacture of antistat layers on film support and it further allows the addition of other resins and polymers increasing the utility of the applied antistat layer.

Example 6

A cellulose triacetate film support having an antihalation layer on one side, an antistat layer prepared as in Example 1B on the antihalation layer and the following described layers in sequence (coverages are in grams per meter squared) on the other side of the cellulose triacetate support:

Slow Cyan Dye-Forming Layer

This layer comprises a blend of redsensitized, cubic, silver bromoiodide emulsion (1.5 mol percent iodide) (0.31 μm grain size) (1.16 g/m$^2$) and red-sensitized, tabular grain, silver bromoiodide emulsion (3 mol percent iodide) (0.75 μm diameter by 0.14 μm thick) (1.31), Compound J (0.965), Compound F (0.011), Compound L (0.65) and gelatin (2.96).

Fast Cyan Dye-Forming Layer

This layer comprises a red-sensitized, tabular grain silver bromoiodide emulsion (6 mol percent iodide) having a diameter of 1.40 μm and a thickness of 0.12 μm (0.807), Compound J (0.102), Compound K (0.065), Compound L (0.102) and gelatin (1.506).

Interlayer

This layer comprises Compound F (0.054), an antifoggant and gelatin (1.291).

Slow Magenta Dye-Forming Layer

This layer comprises a blend of greensensitized tabular grain silver bromoiodide emulsion (3 mol percent iodide) (grain diameter 0.55 μm and a thickness 0.08 μm) (0.473) and tabular grain silver bromoiodide emulsion (3 mol percent iodide) (grain diameter 0.52 and thickness 0.09 μm) (0.495), Compound G (0.161), Compound I (0.108) and gelatin (2.916).

Fast Magenta Dye-Forming Layer

This layer comprises a blend of green-sensitized tabular grain silver bromoiodide emulsion (3 mol percent iodide) (grain diameter 1.05 μm and thickness 0.12 μm) (0,536) and tabular grain silver bromoiodide emulsion (3 mol percent iodide) (grain diameter 0.75 μm and thickness 0.14 μm), Compound G (0.258), Compound H (0.054) and gelatin (1,119).

Interlayer

This layer comprises Carey-Lea Silver (0.43), Compound F (0.054), an antifoggant and gelatin (0.861).

Slow Yellow Dye-Forming Layer

This layer comprises a blend of blue-sensitized tabular grain silver bromoiodide emulsions (3 mol percent iodide) (grain diameter 0.57 μm and thickness 0.12 μm) (0.274) and blue-sensitive silver bromoiodide emulsion (0.3 mol percent iodide) (grain diameter 0.52 μm and thickness 0.09 μm) (0.118), Compound C (1.022), Compound D (0.168) and gelatin (1.732).

Fast Magenta Dye-Forming Layer

This layer comprises a blue-sensitized tabular grain silver bromoiodide emulsion (3 mol percent iodide) (grain diameter 1.10 μm and thickness 0.12 μm) (0.43), Compound C (0.161), Compound D (0.054), Compound E (0.003) and gelatin (0,791).

UV Absorbing Layer

This layer comprises silver halide Lippmann emulsion (0.215), Compound A (0.108), Compound B (0.106) and gelatin (0.538).

Overcoat

This layer comprises insoluble silica coated vinyl toluene matte particles (0.038) and gelatin (0.888) as described in copending application serial number 07/968,801 filed Oct. 30, 1992, assigned to that same assignee as this application and incorporated herein by reference.

The thus prepared photographic film is perforated in 35 mm format, exposed in a 35 mm camera and processed in a standard photofinishing processor. The processed film is printed in a standard photofinishing, high speed printer. The unexposed, exposed and developed film are free of defects due to the antistat layer.
The structures of the above-designated Compounds A through L are as follows:
A:
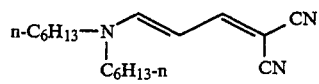
B:
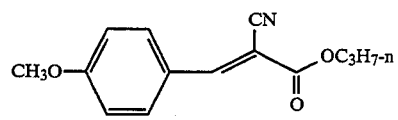
C:
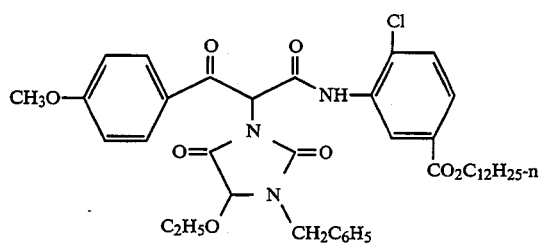
D:
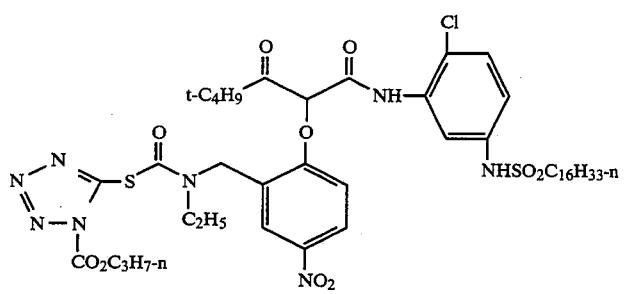
E:
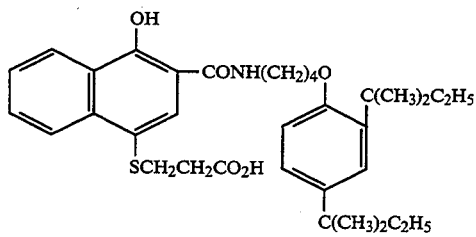
F:
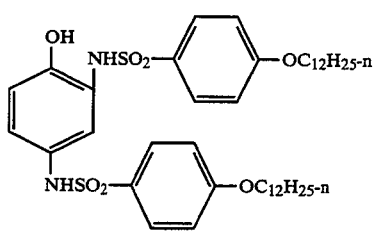

-continued
G:
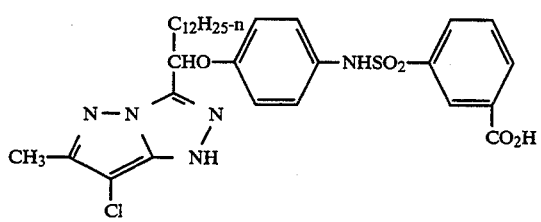
H:
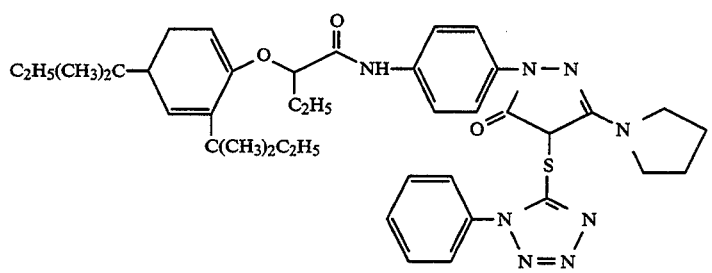
I:
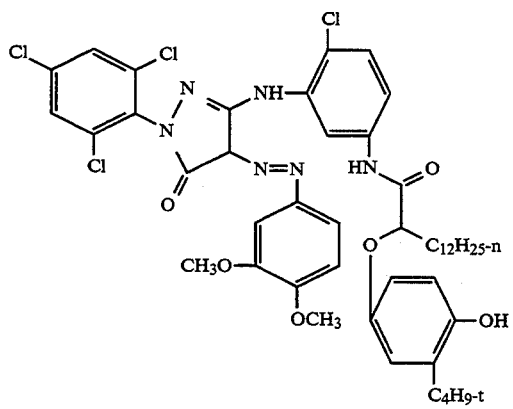
J:
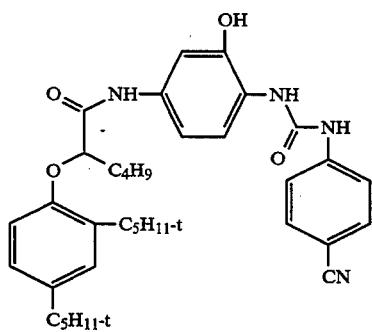
K:
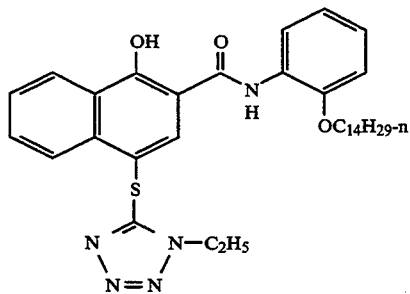

L:

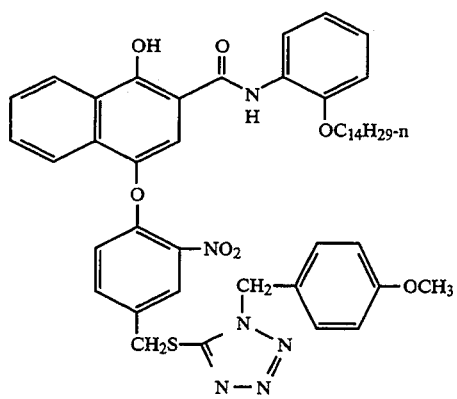

While there has been shown and described what are at present considered the preferred embodiments of the invention, it will be obvious to those skilled in the art that various changes, alterations and modifications may be made herein without departing from the scope of the invention as defined by the appended claims.

What is claimed is:

1. A coating composition for applying an antistat layer to a support which comprises vanadium pentoxide, at least 0.04 parts of cellulose nitrate per part of vanadium pentoxide, and the balance coating vehicle.

2. The coating composition of claim 1 wherein the vanadium pentoxide is present in an amount of from about 0.05 to about 0.2 weight percent and the cellulose nitrate is present in an amount of 0.04 to about 40 parts per part of vanadium pentoxide.

3. The coating composition of claim 2 wherein the cellulose nitrate is present in an amount of from 0.04 parts to parts per part of vanadium pentoxide.

4. The coating composition of claim 2 wherein the cellulose nitrate is present in an amount of from 0,04 parts to 2 parts per part of vanadium pentoxide.

5. The coating composition of claim 1 wherein the vanadium pentoxide is present in an amount less than 0.15 weight percent.

6. The coating composition of claim 1 wherein the vanadium pentoxide is present in an amount less than 0.1 weight percent.

7. The coating composition of claim 1 wherein a polymer binder is also present.

8. The coating composition of claim 7 wherein the binder polymer is present in an amount up to 5 percent by weight based on the total weight.

9. The coating composition of claim 8 wherein the polymer binder is a cellulose ester.

10. The coating composition of claim 9 wherein the cellulose ester is cellulose acetate.

11. The coating composition of claim 7 wherein the polymeric binder is urea formaldehyde resin.

12. The coating composition of claim 1 wherein the vanadium pentoxide is present in an effective amount to achieve conductivity.

13. The coating composition of claim 12 wherein the vanadium pentoxide is present in an amount less than about 0.2 weight percent.

* * * * *

UNITED STATES PATENT AND TRADEMARK OFFICE
CERTIFICATE OF CORRECTION

PATENT NO. : 5,356,468

DATED : October 18, 1994

INVENTOR(S) : Charles T. Havens et al.

It is certified that error appears in the above-indentified patent and that said Letters Patent is hereby corrected as shown below:

Column 11, line 41, after "to" insert --10--.

Column 11, line 43, "0,04" should read --0.04--.

Signed and Sealed this

Sixth Day of June, 1995

Attest:

BRUCE LEHMAN

Attesting Officer     Commissioner of Patents and Trademarks